United States Patent [19]

Simons

[11] Patent Number: 5,209,886
[45] Date of Patent: May 11, 1993

[54] COMPOSITION AND METHOD FOR THE MANUFACTURE OF A BOARD

[75] Inventor: Michael W. Simons, Pretoria, South Africa

[73] Assignee: Plascon Technologies (Proprietary) Limited, Transvaal, South Africa

[21] Appl. No.: 843,082

[22] Filed: Mar. 2, 1992

[30] Foreign Application Priority Data

Mar. 1, 1991 [ZA] South Africa .......................... 91/1519

[51] Int. Cl.$^5$ ........................... D04H 1/70; B27N 3/00
[52] U.S. Cl. ..................................... 264/109; 264/122; 427/212; 427/214
[58] Field of Search ....................... 264/109, 112, 122; 427/202, 212, 214

[56] References Cited

U.S. PATENT DOCUMENTS

| | | | |
|---|---|---|---|
| 3,880,975 | 4/1975 | Lundmark | 264/119 |
| 4,116,163 | 9/1978 | Torelli et al. | 118/303 |
| 4,935,457 | 6/1990 | Metzner et al. | 524/14 |

Primary Examiner—Mary Lynn Theisen
Attorney, Agent, or Firm—Cushman, Darby & Cushman

[57] ABSTRACT

There is provided a method of preparing a natural fibrous material particle composition such as a wood chip composition for use in forming a particle board which includes the steps of impregnating from 50 to 95% by weight of the composition of the particles with a compound selected from coal tar, pitch, asphalt and bitumen dissolved in a solvent therefor such as dichloromethane, applying from 2.5 to 25% by weight of the composition of a novolac resin including a cross-linking agent, in finely divided powder form, to the impregnated particles so that the resin adheres to the impregnated particles, and recovering the solvent. This composition may be used to manufacture a particle board in a platen press by coating the platens of the platen press with a layer of the novolac resin, and then placing the composition between the platnes and subjecting the composition to suitable conditions of temperature and pressure to cause the novolac resin to cross-link to form the board.

23 Claims, No Drawings

COMPOSITION AND METHOD FOR THE MANUFACTURE OF A BOARD

BACKGROUND OF THE INVENTION

This invention relates to a composition and a method for the manufacture of a board which is water and chemical resistant.

Various types of board are known. Examples include plywood made by gluing together sheets of wood veneer, block board made from a core of pine strip glued together with one or more sheets of wood veneer on either side of the core, chipboard or particle board formed from wood chips or particles coated with a suitable liquid adhesive such as a water based urea formaldehyde adhesive and then pressed between the heated platens of a press, and fibre board formed from wood fibres processed and pressed together to form the board. It is also known to make boards from asbestos, sisal, cellulose or other fibres, bound with Portland cement, and gypsum or calcium sulphate lined on either side with kraft paper. In the case of certain types of composite board, such as chipboard, particle board and wood fibre board, they swell when in contact with water and severe fibre lift occurs on finishing. These boards are also subject to chemical degradation, particularly in conditions of high alkalinity or acidity. Some of these boards are characterized by poor behaviour in fire or a rapid surface spread of flame. Boards made from fibre reinforced cement may have high retained alkalinity and may be characterised by high water absorbency. Further, boards made from gypsum may be degraded by water as a result of the solubility of the gypsum. There is thus a need for a new type of board which is preferably made from waste materials, which is resistant to water and chemicals, and which is relatively easy to manufacture.

U.S. Pat. No. 4,521,477 to Gunter H Kiss teaches a multilayer fibre mat which is made up of two cover layers of fibres with a high quality thermosetting plastics impregnation and making up approximately 30% of the whole mat, and a central layer of short fibre wood products with cheap thermoplastic bonding agent additives. Specifically, the central layer is made from short wood fibres bonded with an unoxidised bitumen and which also may contain a small amount of a phenolic resin. USSR Patent Specification No. 1516357 to the Leningrad Forestry Academy teaches a method of manufacturing wood fibre boards comprising the steaming of wood chips, the treatment thereof with tallow pitch in the form of a smelt at 90° C. in an amount of 2.5 to 12% by weight of the chips, the grinding of the chips into fibre, the drying of the fibre, and the mixing thereof with a phenol formaldehyde resin in an amount of 3% by weight of the fibre. Subsequently, the mixture is moulded and hot pressed to form the board.

SUMMARY OF THE INVENTION

According to a first aspect of the invention there is provided a method of preparing a natural fibrous material particle composition for use in forming a natural fibrous material particle board which includes the steps of:

(a) impregnating a major amount by weight of the composition of natural fibrous material particles with a compound selected from the group consisting of coal tar, pitch, asphalt and bitumen, dissolved in a solvent therefor;

(b) applying a suitable amount by weight of the composition of a novolac resin including a cross-linking agent in finely divided powder form to the impregnated particles so that the resin adheres to the impregnated particles; and (c) recovering the solvent.

According to a second aspect of the invention there is provided a method of manufacturing a natural fibrous material particle board in a platen press which includes the steps of:

(a) impregnating a major amount by weight of the composition of natural fibrous material particles with a compound selected from the group consisting of coal tar, pitch, asphalt and bitumen, dissolved in a solvent therefor;

(b) applying a suitable amount by weight of the composition of a novolac resin including a cross-linking agent in finely divided powder form to the impregnated particles so that the resin adheres to the impregnated particles;

(c) recovering the solvent;

(d) coating the platens of the platen press with a layer of a novolac resin including a cross-linking agent; and (e) placing the composition of step (c) between the platens and subjecting the composition to suitable conditions of temperature and pressure to cause the novolac resin to cross-link to form the board.

By a "major amount by weight of the composition" there is meant an amount of 50% or more by weight of the composition.

By "novolac resin" there is meant a resin in which the molar ratio of phenol exceeds the molar ratio of formaldehyde.

By a "cross-linking agent" there is meant a compound which decomposes at the processing temperature to give formaldehyde and a catalyst.

According to a third aspect of the invention there is provided a board made by the method of the invention as set out above.

DESCRIPTION OF EMBODIMENTS

The first aspect of the invention is a method of preparing a natural fibrous material particle composition for use in forming a natural fibrous material particle board. The method utilizes the following components.

The first component is a major amount by weight, preferably 50 to 95%, more preferably 75 to 95%, most preferably about 85% by weight of the composition, of wood or other natural fibrous material particles or mixtures thereof. Suitable particles include wood shavings, wood chips, wood pulp and sawdust as well as mixtures thereof. Preferably, these particles are waste products of a timber mill or wood working operation which would generally be burned, used for the manufacture of pulp or otherwise discarded. Before use, the particles are preferably dried to the water equilibrium point or lower for the climate involved, generally to between 8 and 12% water.

The second component is a suitable amount by weight, preferably 2.5 to 25%, more preferably 5 to 15% by weight of the composition, of a component selected from coal tar, pitch, asphalt and bitumen. This component may be naturally occurring coal tar or pitch or a distillation residue referred to as bitumen, pitch, tar or asphalt. Preferably, this component is an air-blown bitumen, i.e. an oxidised bitumen, typically with a softening point of 105° to 115° C. and a maximum penetration index of 5, which is devoid of volatiles, has a low reactivity and has very similar softening and flow characteristics to the resin. This component is used as a binder in the composition, to impart water resistant and chemical resistant properties, and to act as an extender to the resin.

The third component is a solvent for the previous component. The amount by weight of the solvent used will depend on the amount by weight of the previous component in the composition and on the solubility of the previous component in the solvent. Suitable solvents include aromatic solvents and halogenated hydrocarbon solvents. Examples of suitable solvents include xylene, toluene, benzene and chlorinated hydrocarbon solvents, such as dichloroethylene, trichloroethylene and particularly dichloromethane. The solvent must preferably dissolve the previous component to an extent of 99.5% or more and must preferably have a low boiling point to promote its easy recovery from the composition in step (c). The preferred solvent is dichloromethane because of its very high solvent capability, its low boiling point and ease of recovery, and the fact that it does not interfere with the chemistry or composition of the other components of the composition, and is non-flammable.

The fourth component is a suitable amount by weight, preferably from 2.5 to 25%, more preferably from 5 to 15%, by weight of the composition of a novolac resin including a cross-linking agent. The resin must be in finely divided powder form. A preferred novolac resin in the resin BCB 3300 from General Chemical Corporation of South Africa under licence to Borden Chemical Company of the USA, which is a fine particle powder novolac phenol formaldehyde resin which is formulated with a cross-linking agent which is both a formaldehyde donor and a catalyst, such as trioxane or hexamethylene tetramine. The resin has a softening point of the order of 110° C. at which temperature it softens and commences to flow and cross-linking is induced to commence by the decomposition of the cross-linking agent, resulting in the formation of a hard three-dimensional molecular make-up at a temperature in the order of 135° C.

Novolac resins have the advantage that they contain no liquid and therefore there is no shrinkage involved and no strain on the molecular network, and they are resistant to chemicals and water.

An optional component of the composition is a suitable amount by weight, preferably 5 to 20% by weight of the natural fibrous material particles of a crumbed natural or synthetic rubber material. Preferably, the crumbed natural or synthetic rubber material has an approximate particle size of 30 to 40 mesh and may be produced for example by the grinding of old automobile types or other waste rubber. This component imparts shock resistance to the board, promotes synergistic adhesion with the coal tar, pitch, bitumen or asphalt and acts as a void filler. The presence of this component also provides the board with good nail holding characteristics and reduces the brittleness of the board.

The first step of the methods of the invention is to impregnate the natural fibrous material particles with the coal tar, pitch, asphalt or bitumen dissolved in the solvent therefor. Preferably, the particles are impregnated with a bitumen dissolved in dichloromethane, at a concentration of from 5 to 25%, more preferably of the order of 12.5% by weight. The particles are submerged in the solution until penetration through the particles is complete, which normally requires less than a minute.

The crumbed rubber material, if present, may be added in the first step.

The impregnated particles are withdrawn from the solution and allowed to drain.

In the second step, while still wet, i.e. before the withdrawal of the solvent, the novolac resin including the cross-linking agent in fine powder form is applied to the impregnated chips, for example by spraying, so that the resin adheres to the impregnated chips. The particles may be mechanically agitated to ensure good and even distribution and mixing of the resin on the surface of the impregnated natural fibrous material particles.

The third step of the methods of the invention is to recover the solvent by evaporation. The solvent so recovered may be regenerated for re-use.

The result of these three steps is a composition which may be stored until required or may be transported to another site for formation into a particle board. In this composition, the coal tar, pitch, asphalt or bitumen and the novolac resin are effectively in a latent condition and are not degraded in storage. This means that the composition may be made at the site of a sawmill or the like and then transported to a factory or plant remote from the sawmill for further processing.

The second aspect of the invention is a method for the manufacture of a natural fibrous material particle board in a platen press which involves the first three steps (a) to (c) set out above, as well as two additional steps (d) and (e).

In step (d), the platens of the platen press are coated with a layer of the novolac resin including the cross-linking agents in fine powder form so that during the pressing operation, molten coal tar, pitch, asphalt or bitumen does not reach the platens and the board produced has a surface layer of the resin on either side.

In step (e), the composition of step (c) is placed between the platens and subjected to suitable conditions of temperature and pressure, which are conventional for the manufactured of particle boards, to cause the novolac resin to cross-link to form the board.

It is to be noted that the board may include reinforcing fibres either within the composition of step (c) or mixed in with the layer of the novolac resin applied to the platens of the platen press.

The platen press used in the method may be for example a plywood press and the composition may be compressed typically at a pressure of from 500 to 400 psi, preferably at about 2000 psi, at a temperature of from 95° C. to 150° C., preferably at about 135° C., for about 5 to 40 minutes, usually about 1 minute per mm thickness of the board.

During this pressing and heating process, the bitumen softens at about 105° C. and commences to flow. The novolac resin powder likewise changes from a solid to a liquid phase and commences to flow at a similar temperature. The resin, after a suitable period, cross-links and sets to a very hard substance, binding the composition to form the board.

The board is thereafter removed from the press and on cooling, the bitumen reverts to a solid contributing its waterproofing and binding properties to the board.

The result is a board which may be used as a shutter board for the civil engineering and concreting industry, as a building component such as roof cladding, wall cladding and flooring, and for the manufacture of other articles typically made of wood.

If required, the board may be decorated after manufacture. For example, the board surfaces may be heated to a temperature of between 135° to 195° C., typically about 175° C., and a powder coating based on a polyurethane, a polyester, an epoxy or a phenolic resin or a copolymer thereof, which includes a pigment, is sprayed on the surface of the board and on impact, sticks to the board surface and cures to form a decorative film.

An example of the invention will now be given.

EXAMPLE 1

A mixture of 500 g wood shavings, 500 g sawdust or wood flour and 1000 g of wood chips is soaked in a mixture of 6000 g of bitumen Mobil Grade 110/2 and 48000 g of dichloromethane.

The wood product mixture is removed from the soaking vat after a period of approximately 5 minutes, excess liquids are allowed to drain back into the vat and the impregnated wood product mixture is mechanically separated.

Into this is blown finely powdered novolac phenol formaldehyde resin with a hexamine cross-linking agent formulated into it, at the rate of 10% on the wood product mixture weight. The resin impacts with the bitumen coated wood product mixture, and the resin particles stick on to the surface.

The dichloromethane solvent is evaporated, recondensed and thereby recovered for re-use.

The product is now pressed between the heated platens of a plywood press at 135° C. for about 20 to 30 minutes with a layer of the phenol formaldehyde resin powder on the outer surfaces of the platens, to produce a water and chemical resistant board.

I claim:

1. A method of preparing a natural fibrous material particle composition for use in forming a natural fibrous material particle board includes the steps of:
   (a) impregnating a major amount of weight of the composition of natural fibrous material particles with a compound selected from the group consisting of coal tar, pitch, asphalt and bitumen, dissolved in a solvent therefor;
   (b) applying a suitable amount by weight of the composition of a novolac resin including a cross-linking agent in finely divided powder form to the impregnated particles so that the resin adheres to the impregnated particles; and
   (c) recovering the solvent.

2. A method according to claim 1 wherein step (a) there is used from 50 to 95% by weight of the composition of the natural fibrous material particles.

3. A method according to claim 1 wherein step (a) there is used from 75 to 95% by weight of the composition of the natural fibrous material particles.

4. A method according to claim 1 wherein in step (a) there is used from 2.5 to 25% by weight of the composition of the compound selected from the group consisting of coal tar, pitch, asphalt and bitumen.

5. A method according to claim 1 wherein in step (a) there is used from 5 to 15% by weight of the composition of the compound selected from the group consisting of coal tar, pitch, asphalt and bitumen.

6. A method according to claim 1 wherein in step (a) the natural fibrous material particles are impregnated with bitumen dissolved in a solvent therefor.

7. A method according to claim 1 wherein the solvent is selected from the group consisting of xylene, toluene, benzene and dichloroethylene, trichloroethylene, dichloromethane and mixtures of two or more thereof.

8. A method according to claim 7 wherein the solvent is dichloromethane.

9. A method according to claim 1 wherein in step (a) there is added from 5 to 20% by weight of the natural fibrous material particles of a crumbed natural or synthetic rubber material.

10. A method according to claim 1 wherein in step (b) there is used from 2.5 to 25% by weight of the composition of the novolac resin.

11. A method according to claim 1 wherein in step (b) there is used from 5 to 15% by weight of the composition of the novolac resin.

12. A method of manufacturing a natural fibrous material board in a platen press includes the steps of:
   (a) impregnating a major amount by weight of the composition of natural fibrous material particles with a compound selected from the group consisting of coal tar, pitch, asphalt and bitumen, dissolved in a solvent therefor;
   (b) applying a suitable amount by weight of the composition of a novolac resin including a cross-linking agent in finely divided powder form to the impregnated particles so that the resin adheres to the impregnated particles;
   (c) recovering the solvent;
   (d) coating the platens of the platen press with a layer of a novolac resin including a cross-linking agent; and
   (e) placing the composition of step (c) between the platens and subjecting the composition to suitable conditions of temperature and pressure to cause the novolac resin to cross-link to form the board.

13. A method according to claim 12 wherein step (a) there is used from 50 to 95% by weight of the composition of the natural fibrous material particles.

14. A method according to claim 12 wherein in step (a) there is used from 75 to 95% by weight of the composition of the natural fibrous material particles.

15. A method according to claim 12 wherein in step (a) there is used from 2.5 to 25% by weight of the composition of the compound selected from the group consisting of coal tar, pitch, asphalt and bitumen.

16. A method according to claim 12 wherein in step (a) there is used from 5 to 15% by weight of the composition of the compound selected from the group consisting of coal tar, pitch, asphalt and bitumen.

17. A method according to claim 12 wherein in step (a) the natural fibrous material particles are impregnated with bitumen dissolved in a solvent therefor.

18. A method according to claim 12 wherein the solvent is selected from the group consisting of xylene, toluene, benzene, dichloroethylene, trichloroethylene, dichloromethane and mixtures of two or more thereof.

19. A method according to claim 18 wherein the solvent is dichloromethane.

20. A method according to claim 12 wherein in step (a) there is added from 5 to 20% by weight of the natural fibrous material particles of a crumbed natural or synthetic rubber material.

21. A method according to claim 12 wherein in step (b) there is used from 2.5 to 25% by weight of the composition of the novolac resin.

22. A method according to claim 12 wherein in step (b) there is used from 5 to 15% by weight of the composition of the novolac resin.

23. A method according to claim 12 wherein in step (e) the composition is subjected to a pressure of from 500 to 4000 psi and a temperature of from 95° C. to 150° C.

* * * * *

UNITED STATES PATENT AND TRADEMARK OFFICE
CERTIFICATE OF CORRECTION

PATENT NO. :
DATED        :   5,209,886
INVENTOR(S) :   May 11, 1993
                Simons It is certified that error appears in the above-identified patent and that said Letters Patent is hereby corrected as shown below:

Title page,
Change the inventor's name to read:

item [75]   Inventor:   Michael Windsor Symons

Signed and Sealed this

First Day of February, 1994

Attest:

BRUCE LEHMAN

Attesting Officer      Commissioner of Patents and Trademarks